United States Patent Office 3,209,771
Patented Oct. 5, 1965

3,209,771
METHOD FOR CONTROLLING INTERFACE IN
PIPELINE FLUID TRANSPORT
William B. Gogarty and Charles W. Gullikson, both of
Littleton, Colo., assignors to Marathon Oil Company, a
corporation of Ohio
No Drawing. Filed Oct. 12, 1961, Ser. No. 144,590
10 Claims. (Cl. 137—1)

This invention relates to pipeline transport of fluids and more particularly to interface control with different fluid flowing in the same pipeline.

In recent years one of the more important phases of pipeline transport of fluids has been interface control when different fluids are flowing through the same pipeline. The importance of precise control is more acute where there is a great variation in grade and quality between different fluids flowing in the same pipeline. In the petroleum industry, for example, crude oil of high sulfur content may follow or precede a crude of low sulfur content, or gasoline may follow fuel oil in a products line. Intermixing of such flows may result in the more valuable composition being lessened in value when it is adulterated by intermixing with even minor quantities of the less valuable composition. As such deleterious results may occur in both a crude pipeline and a products pipeline, some satisfactory interface control must be provided for efficient operation.

Various practices and procedures have been suggested for controlling the interfaces between such different fluids flowing in the same pipeline. One of these practices has been to cause high flow rates in the fluids so that turbulent flow occurs and the velocity profiles are maintained relatively flat, thereby limiting the linear extent of intermixing of fluids. Another has been the use of what is termed "a batching pig" which consists of a hollow or solid sphere or a plurality of interconnected cups which serve to provide physical separation between such fluids flowing in a line.

While the foregoing practices are satisfactory to a degree, they do not completely fulfill the need for flexibility in interface control. For instance, turbulent flow conditions are not always possible in that the amount of fluid material available for pumping is not sufficient to allow the maintenance of flow in a selected turbulent region within a line; and mixing may occur under conditions of turbulent flow and this condition is more aggravated under conditions of laminar flow. Also, particularly under colder weather conditions with related increases in viscosity, flow mechanism becomes laminar. The batching pigs above mentioned are satisfactory for many purposes. However, a certain amount of fluid material slips past the pig and intermixes with adjacent fluids flowing in the same pipeline.

Accordingly, it is an object of this invention to provide a simple, efficient and economical interface control for different fluids flowing in the same pipeline.

Another object of the invention is to provide an efficient interface control between different fluids flowing in the same pipeline, which does not require additions to existing equipment, nor the addition of special auxiliary equipment of a permanent type for insertion and removal of interface separating means.

A further object of the invention is to provide simple, economical and efficient means to control the interface between different fluids flowing in the same pipeline which is effective under both laminar and turbulent flow conditions.

Yet another object of the invention is to provide method and means for controlling the interface between different fluids flowing in the same pipeline which effectively separates such fluids and eliminates mixing with adjacent fluids to any substantial degree.

Still another object of the invention is to provide simple and inexpensive means for controlling the interface between different fluids flowing in a pipeline which means is disposable at the end of a flow cycle thereby overcoming the necessity for recovery and return to insertion points, and greatly reducing the expense and labor previously associated with such an operation as well as other expense factors.

One of the innovations of this invention by which interfaces between different fluids flowing in a common pipeline may be controlled is the use of what may be termed a fluid or liquid plug. This liquid plug may be formulated from one of the liquids or a mixture of liquids at the interface, or from a fluid not flowing in the line, and in any event it is mixed with a thickening agent which tends to cause such a mixture to congeal or set in a self-sustaining gel-like mass. We have found that either hydrocarbon or water gels may be effective for this purpose, and a combined hydrocarbon and water gel also may be used to produce effective gelling plugs when placed in successive arrangement for interface separation. In the practice of this invention, a number of barrels of any such gel-like mass are merely introduced into the line between the flowing fluids and the congealed plug or pig so formed in the line is moved with the fluids under normal pumping pressure.

Types of thickening agents which may be used to form the gel-like plugs in hydrocarbon type fluids may be mono-, di-, or trivalent soaps of different fatty acids. However, any material which tends to form a gel-like mass, which mass has relatively high viscosity, may be used, particularly in forming an aqueous gel. It should be understood that a hydrocarbon gel can be mixed with a water gel to form the aforesaid succession of gelling plugs. The term "high apparent viscosity" is descriptive of the non-Newtonian fluids of the materials useful in the practice of this invention. That is, they exhibit high shear strength and this shear strength is not a linear function of the rate of shear.

A gel formed of water will be completely immiscible with hydrocarbon fluids and the hydrocarbon gels of this invention tend to resist dissolution in fluids abutting the interface they define. Once flow has been established in a given pipeline with one of our gel-like masses disposed at the interface between different fluids in the pipe line, it has a tendency to coalesce or congeal and form a generally cylindrical body. The outer peripheral surface of the cylinder is contiguous with the inner surfaces of the pipeline through which the gel and the adjoining fluids are flowing and the plug tends to reform whenever surface irregularities distort its shape or break it into pieces. Even the flow of broken pieces will reduce mixing between the two fluids. The respective ends of the gel cylinder abut the different fluids whether the flow is laminar or turbulent and the end walls of the liquid pig which abut the different fluids tend to be perpendicular relative to the longitudinal axis of the pipe line. Such an arrangement allows rather precise diversion of the different fluids at a tank storage or other disposal system as will be described in more detail hereafter.

An important advantage in the use of congealed fluid gels according to this invention for control of interfaces between different fluids flowing in a common pipeline is that they may be made fluid enough in character to pass through a pump. In installations where the plugs do not pass through a pump, gels of a much higher viscosity may be used. In present practice, pigs passing through a pipeline may be directed through the main line adjacent a booster pump located in a by-pass line, while the conducted fluid flows through the by-pass into the booster pump and back into the line. This by-pass action results in some additional mixing of fluids. Due to the self-sustaining characteristics of the gels of this invention and their tendency to coalesce and reform as a single mass when broken or agitated, intermixing of the separated fluids is prevented even when the fluid plug or gel is passed through a pump.

Gels exhibiting thixotropic properties are particularly useful since they tend to be more easily pumped and form back into a single mass after passage through the pump. But as noted above, any gel-like mass having high relative viscosity, e.g., a high apparent viscosity, in relation to associated pipeline fluids and high relative shear strength; and which is substantially immiscible with such associated pipeline fluids and has self-sustaining characteristics with inherent healing properties under prevailing temperatures of the pipeline in which it is introduced will provide the desired interface control according to our invention.

When hydrocarbon fluids are gelled or congealed for controlling an interface, aluminum salts of stearic and caprylic acids are preferable. It has been discovered that an acrylamide copolymer when catalyzed with aluminum sulfate is a preferable material to gel water. Carboxymethylcellulose when catalyzed with aluminum sulfate also may be used to gel water. Aluminum octoate gels of hydrocarbon fluids are useful since they resist dissolution of the fluids abutting the interface to a high degree.

Where the term "congealed" is used in this specification, it is employed in its recognized sense as being of jelly-like consistency, rather than solidified, as when water is converted to ice. The plug must retain sufficient fluidity to conform its shape to varying contours of the line and must move or slip readily through the line.

When the flow reaches the end of a pipeline, the approach and proximity of an interface is easily determined when using gelled masses according to this invention. This may be done by insertion of a simple instrument into the line which indicates variance in drag. The drag of the gelled masses is obviously much greater than that of any of the lower viscosity fluids being pumped through the lines. When the proximity of the gelled mass is sensed, simple valve manipulation will direct the different fluids to separate storage facilities or the like. No physical separation of the gelled mass is necessary before directing the different fluids to storage, as the gelled masses tend to sink or float in the different fluids when not under pumping pressure and thus may be mechanically separated by decanting or skimming in the storage containers without requiring special tools or complicated equipment.

An important property of gelled masses of this invention is their high relative viscosity, which prevents a following fluid from penetrating the gelled mass to reach a preceding fluid and this substantially eliminates mixing between adjacent liquids when being pumped through the same pipeline. The gelled plug maintains a sharp physical separation between conducted fluids whether adjacent fluids in the pipeline are in laminar or turbulent flow.

Because of the non-Newtonian and self-sustaining character of gelled masses according to this invention they are not distorted and maintain their generally cylindrical flow configuration contiguous with the pipeline through which it is flowing whether such line is essentially vertical or horizontal. The liquid pig of this invention is particularly useful in pipe lines changing from one diameter to another. For example, as it passes from an 8" diameter line into a 12" line, the pig becomes shorter, but still is effective in maintaining the separation of the fluids.

In a typical installation for the practice of the invention, a mixing tank is interconnected through suitable valving with a pipeline system through which different fluids are transported. A quantity of water or a hydrocarbon fluid to be gelled is introduced into the mixing tank and a gelling agent according to this invention is added thereto. When the gelling agent has caused the liquid with which it is mixed to assume a thickened, yet fluid and gel-like character, it is introduced into the pipeline with which the mixing tank is interconnected to follow behind the flow of one of the fluids conducted by said pipeline. Thereafter, the second or following fluid is introduced into that pipeline behind the gelled mass. Pumping pressure is exerted upon these materials in the pipe line and causes the gel-like mass to coalesce and assume a generally cylindrical shaping with its outer surface contiguous with the inner surface of the pipeline and its end portions flat and in contiguous relation with the following fluid.

If it is desired to increase or boost the pumping pressure in the line, the fluids therein are passed through a booster station pump. After the gel-like mass passes through such a pump, its self-healing qualities cause it to rapidly reform as a homogenous and self-sustaining mass or body.

Upon reaching a destination where different fluids are to be removed from the pipeline and passed to separate storage or other facilities, the presence of an interface between the different fluids is easily determined by sensing an abrupt increase in drag in the fluids passing through the pipeline. This occurs when the gel-like mass at the interface passes a drag instrument inserted in the pipeline. When the mass is sensed, the different fluids are segregated by suitable valve operation and passed to separate storage facilities. No removal of the gel-like mass is necessary at this point, and it is conducted with one of the different fluids directly to storage.

From the preceding description of the invention, it will be apparent that the present invention is particularly suited for use in a products line and will effectively eliminate mixing between fluids, such as fuel oil and gasoline flowing in such a line. The method of the present invention can be used effectively with heavy or light crude oils flowing in either the turbulent or laminar region. Separation of crudes is required when they differ in sulfur content. By utilizing a gel-like material with a high relative viscosity, it can be formed as a plug between such flows and the pumping pressure tends to force out any air entrained during the mixing action. The plug does not mix with the abutting materials because of its high relative viscosity and by assuming a cylindrical shape moving in contact with the inner surface of the line, provides an effective barrier against mixing of the conducted fluids.

The fact that the gelled material from which the plug has been formed has the characteristic of coalescing and reforming if the plug is broken up or separated to any degree in moving through a pump, greatly enhances the use of such a vehicle in interface control in crude or product lines, as the flow through such line usually passes a plurality of booster pumps between the input and discharge ends of the line. We have disclosed a number of compositions suitable for use in forming the gel-like mass and in addition have defined the properties and characteristics required in the utilization of our invention which will permit selection of other materials having similar properties and characteristics when the use of such materials in place of the enumerated compositions is preferable for any reason.

It should be understood that various modifications of the above described process and means for control of interface between different fluids flowing in a common pipeline may be availed of within the scope of this invention. For example, water base, hydrocarbon base, alcohol base and any other fluid base gel may be used, provided it has the necessary properties and characteristics previously described. Other changes and modifications may be availed of within the scope of the invention as defined in the following claims.

We claim:

1. The method of separating the interface between different fluids flowing in a pipeline, which comprises introducing into the pipeline between said different fluids a gel-like mass substantially immiscible with said different fluids and of higher viscosity than either fluid, said gel-like mass being formed from acrylamide copolymer catalyzed with aluminum sulfate, and moving said fluids and the interposed gel-like mass through said pipeline under pumping pressure which forms said mass into a self-sustaining, substantially cylindrical body having its peripheral surfaces contiguous with the inner surfaces of the pipeline and its end contiguous with the respective fluids.

2. The method of separating the interface between different fluids flowing in a pipeline, which comprises introducing into the pipeline between said different fluids a self-sustaining, gel-like mass substantially immiscible with said different fluids and having a higher viscosity than said fluids, applying the force of the following fluid under pumping pressure in the line to form said mass into a substantially cylindrical body having its peripheral surfaces contiguous with the inner surfaces of the pipeline throughout its progressive movement in the line and having its ends contiguous with the respective fluids, said body having sufficient fluidity to conform its shape to varying contours of the line through which it is moved, moving said different fluids and the cylindrical body through a pump during its course of travel, and thereafter subjecting the gel-like material discharge into another section of the pipe line to a pumping pressure of said pump capable of causing it to reform as a cylindrical body interposed between said fluid flows.

3. The method of separating the interface between different fluids flowing in a pipeline, which comprises introducing into the pipeline between said different fluids a self-sustaining, gel-like mass substantially immiscible with said different fluids and having a higher viscosity than said fluids, said mass being a composition selected from the class consisting of gels of polymers and water, gels of polymers and hydrocarbons and gels of hydrocarbons containing transition metal esters, applying the force of the following fluid under pumping pressure in the line to form said mass into a substantially cylindrical body having its peripheral surfaces contiguous with the inner surfaces of the pipeline throughout its progressive movement in the line and having its ends contiguous with the respective fluids, and said body having sufficient fluidity to conform its shape to varying contours of the line through which it is moved.

4. The method as defined in claim 3 in which the gelled composition is formed from aluminum octoate and a hydrocarbon fluid.

5. The method as defined in claim 3 in which the gelled composition is an acrylamide copolymer catalyzed with aluminum sulfate.

6. The method of separating the interface between different fluids flowing in a pipeline, which comprises introducing into the pipeline between said different fluids a self-sustaining, gel-like mass formed from carboxymethylcellulose catalyzed with aluminum sulfate in a water base, said mass being substantially immiscible with said different fluids and having a higher viscosity than said fluids, applying the force of the following fluid under pumping pressure in the line to form said mass into a substantially cylindrical body having its peripheral surfaces contiguous with the inner surfaces of the pipeline throughout its progressive movement in the line and having its ends contiguous with the respective fluids, and said body having sufficient fluidity to conform its shape to varying contours of the line through which it is moved.

7. The method of separating the interface between different fluids flowing in a pipeline, which comprises introducing into the pipeline between said different fluids a self-sustaining, gel-like mass formed from a quantity of one of said different fluids and a soap of a fatty acid selected from the group consisting of mono-, di-, and trivalent soaps of fatty acid, said mass being substantially immiscible with said different fluids and having a higher viscosity than said fluids, applying the force of the following fluid under pumping pressure in the line to form said mass into a substantially cylindrical body having its peripheral surfaces contiguous with the inner surfaces of the pipeline throughout its progressive movement in the line and having its ends contiguous with the respective fluids, and said body having sufficient fluidity to conform its shape to varying contours of the line through which it its moved.

8. The method of separating the interface between different fluids flowing in a pipeline, which comprises introducing into the pipeline between said different fluids a self-sustaining, gel-like mass formed from a hydrocarbon fluid and the aluminum salt of stearic acid, said mass being substantially immiscible with said different fluids and having a higher viscosity than said fluids, applying the force of the following fluid under pumping pressure in the line to form said mass into a substantially cylindrical body having its peripheral surfaces contiguous with the inner surfaces of the pipeline throughout its progressive movement in the line and having its ends contiguous with the respective fluids, and said body having sufficient fluidity to conform its shape to varying contours of the line through which it is moved.

9. The method of separating the interface between different fluids flowing in a pipeline, which comprises introducing into the pipeline between said different fluids a self-sustaining, gel-like mass formed from a hydrocarbon fluid and the aluminum salt of caprylic acid, said mass being substantially immiscible with said different fluids and having a higher viscosity than said fluids, applying the force of the following fluid under pumping pressure in the line to form said mass into a substantially cylindrical body having its peripheral surfaces contiguous with the inner surfaces of the pipeline throughout its progressive movement in the line and having its ends contiguous with the respective fluids, and said body having sufficient fluidity to conform its shape to varying contours of the line through which it is moved.

10. The method of operating a pipeline comprising sequentially flowing between predetermined points in a pipeline a first fluid, a gelled mass which slips readily within the pipeline, and a second fluid, said gelled mass being selected from the group consisting of gels of polymers and water, gels of polymers and hydrocarbons, and gels of hydrocarbons containing transition metal esters, and said gelled mass being characterized in said pipeline flow as being sufficiently fluid to conform its shape to varying contours of the pipeline, as having an apparent viscosity much greater than the viscosity of the first and second fluids, and being self-sustaining.

References Cited by the Examiner

UNITED STATES PATENTS

| | | | |
|---|---|---|---|
| 2,953,146 | 9/60 | Gordon | 137—1 |
| 2,965,114 | 12/60 | Harden | 137—1 |
| 3,057,758 | 10/62 | Walker | 15—104.06 XR |

WILLIAM F. O'DEA, *Primary Examiner.*

M. CARY NELSON, ISADOR WEIL, *Examiners.*